(No Model.)
R. G. YONGE.
COMBINATION TOOL.
No. 284,109. Patented Aug. 28, 1883.
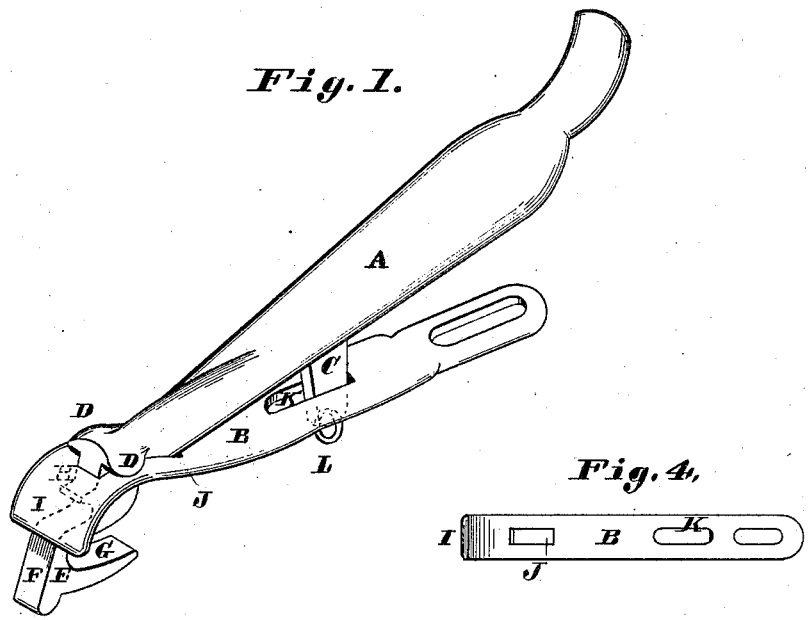
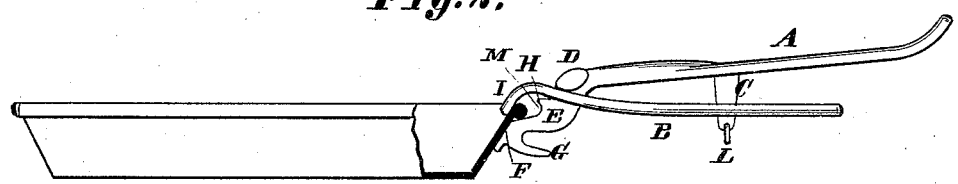
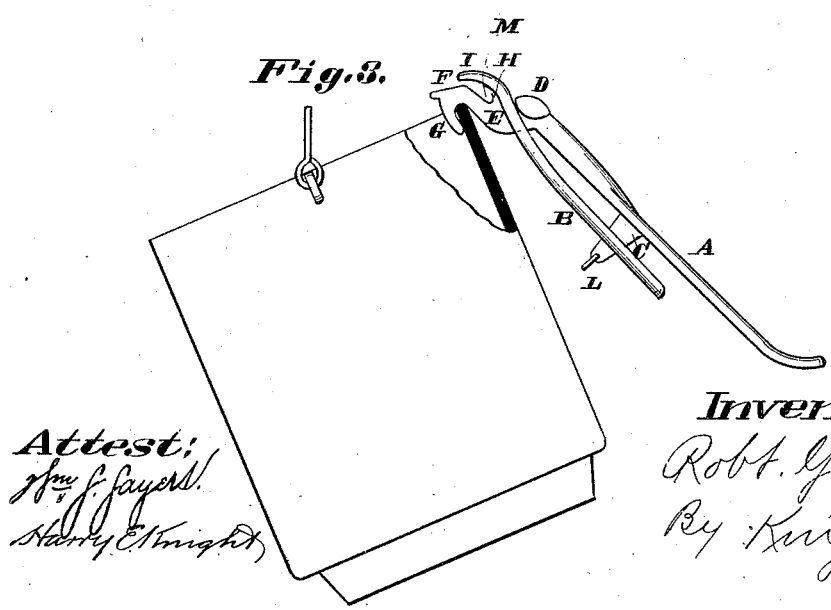
Attest:
Wm. G. Fayerll
Harry E. Knight
Inventor:
Robt. G. Yonge
By Knight Bros
Attys

UNITED STATES PATENT OFFICE.

ROBERT G. YONGE, OF ST. LOUIS, MISSOURI.

COMBINATION-TOOL.

SPECIFICATION forming part of Letters Patent No. 284,109, dated August 28, 1883.

Application filed January 10, 1883. (No model.)

*To all whom it may concern:*

Be it known that I, ROBERT G. YONGE, of the city of St. Louis, in the State of Missouri, have invented a certain new and useful Improvement in Combination-Tools, of which the following is a full, clear, and exact description, reference being had to the accompanying drawings, forming part of this specification, and in which—

Figure 1 is a perspective view of the implement; Fig. 2, a side view of same, showing it secured to a plate or pan. Fig. 3 is a similar view, showing how it can be used for tilting a pot; and Fig. 4 is an under view of the lower part of the instrument.

My invention relates to an implement for handling culinary articles or vessels, more particularly heated articles—as, for instance, removing bread and pie pans from the oven, &c.

My invention consists in an implement composed of two parts or members which are secured together, and are of such a shape that by bringing their forward ends into contact with the rim of any shaped pan, plate, or dish, as shown in Fig. 2, and then pressing their outer ends together, after the manner of a pair of pinchers, they will take a secure hold of the article, as more fully described hereinafter.

Referring to the drawings, A represents one of the parts or members, and B the other. The part A is somewhat longer than that B, forming the handle of the implement. Projecting from the under side of the part A is a shank or stem, C, and upon its forward end are ears or projections D D and a downturned portion, E, with a flat face, F, and a horn or hook, G. Between the flat portion F and the ears D is a projection, H. The part or member B has a downturned forward end, I, a slot, J, near its forward end, and a slot, K, near its center or middle. In putting the two parts of the implement together the downturned portion E of the part A is passed through the slot J of the part B until the part B comes against the ears D, and then the shank or stem C of the part A is passed through the slot K of the part B, and a ring or pin, L, passed through a small hole in the end of the shank to keep the part B from coming off. The downturned portion E of the part A is preferably cut away just above the face F, forming a recess, M, which receives the bead or outturned flange of the pan or plate, as shown in Fig. 2.

It will thus be seen that by placing the forward end of the implement upon the rim of a pan or like article, as shown in Fig. 2, and then pressing the outer ends toward each other the implement will take a secure hold of the article, whatever shape it may be.

The principal object of the hook G is to engage the top of a pot to tilt it, as shown in Fig. 3; but it may also be used for lifting a pot or kettle by engaging with the bail or handle. When the two parts are put together, the forward end of that B is held between the ears D and the projection H of the part A.

The handle end of the part A may be used for a lifter, and for that reason or purpose it is turned up. If made of malleable iron, the shank or stem C may have a teat or projection, which can be hammered over to take the place of the ring or pin L to prevent the part B from coming off.

I claim as my invention—

1. In a combination-tool, the part A, having shank or stem C, ears D, and downturned portion E, provided with face F and projection H, in combination with part B, having downturned end I and slots J and K, all substantially as shown and described, for the purpose set forth.

2. In a combination-tool, the part A, having shank or stem C, ears D, and downturned portion E, with face F, projection H, and recess M, in combination with part B, having a downturned end, I, and slots J K, all substantially as shown and described, for the purpose set forth.

3. In a combination-tool, the part A, having shank or stem C, ears D, and downturned portion E, with face F, projection H, and hook or horn G, in combination with part B, having a downturned end, I, and slots J K, all substantially as shown and described, for the purpose set forth.

ROBERT G. YONGE.

In presence of—
SAML. KNIGHT,
GEO. H. KNIGHT.